April 2, 1963   E. B. CLARK   3,083,857
FLOOR OUTLET FOR UNDERFLOOR DUCT
Filed June 6, 1960   2 Sheets-Sheet 2
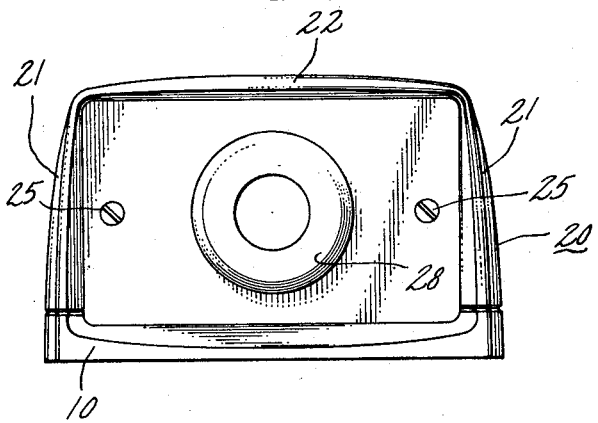
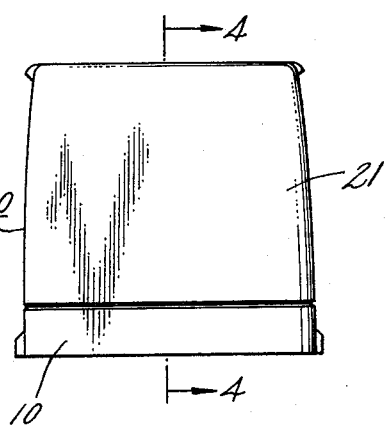
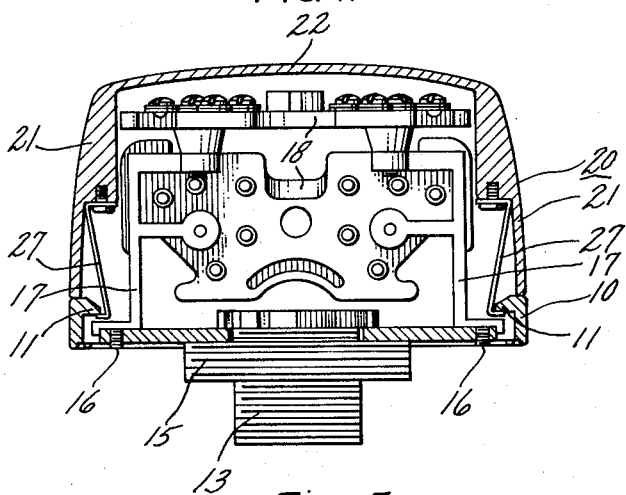
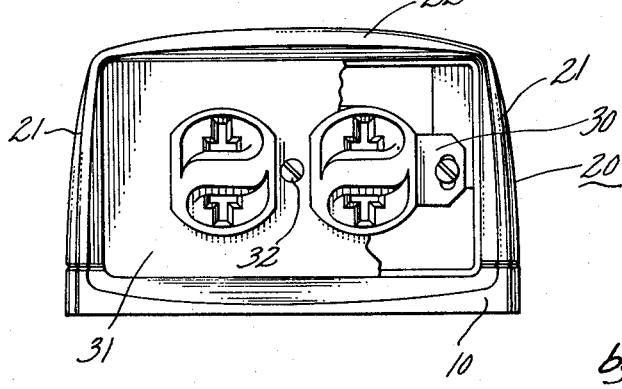
Inventor:
Edward B. Clark
by Allard A. Braddock
His Attorney 3,083,857
FLOOR OUTLET FOR UNDERFLOOR DUCT
Edward B. Clark, Milford, Conn., assignor to General
Electric Company, a corporation of New York
Filed June 6, 1960, Ser. No. 34,319
1 Claim. (Cl. 220—3.94)

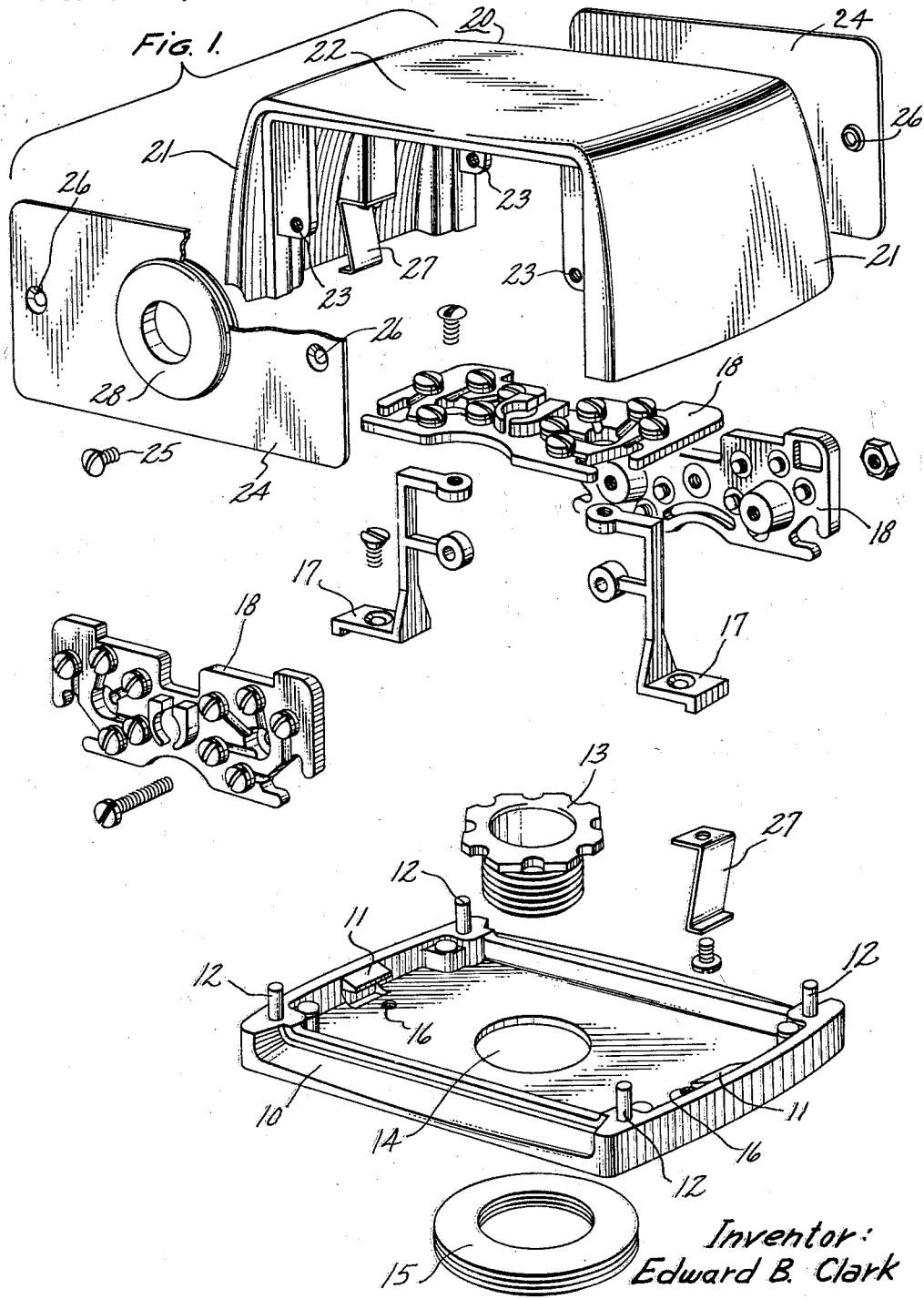

This invention relates to an improved floor outlet for distribution duct. More particularly, the invention relates to a floor outlet for underfloor duct wherein electric terminals are readily accessible during installation.

Floor outlets for underfloor duct are normally mounted flush with the floor on an insert leading up from the underfloor duct. Conventionally, the floor outlet has consisted of two die castings—a base and a three-sided top member which is maintained in position by screws leading upward from the underside of the base. The two open sides of the top member have threaded apertures to accommodate face plates or electrical outlets. Once such an outlet box is in position and the wiring is extended through the insert, it is possible to connect the wiring into a standard double outlet mounted on a plate and then connect the plate to one of the open faces of the outlet. Use of this type of outlet has been somewhat limited due to the fact that its interior had limited access only. For example, a standard telephone terminal block could not be placed in the outlet box because some of the terminal screws would be inaccessible once the box was mounted on the insert.

One of the objects of the present invention is to provide an outlet box for underfloor duct wherein the base is first mounted on the insert and the top member is added after completion of the wiring.

Another object of the present invention is to provide an outlet for underfloor duct wherein a telephone terminal block may be positioned on a base member prior to attachment of a top member.

The above and other objects are accomplished in accordance with the following specification and accompanying drawing wherein:

FIG. 1 is an exploded perspective view of a floor outlet with a telephone terminal block;

FIG. 2 is an assembled front view of the outlet illustrated in FIG. 1;

FIG. 3 is a side view of the outlet illustrated in FIG. 2;

FIG. 4 is a sectional view taken along the lines 4—4 of FIG. 3; and

FIG. 5 is a partially broken view of an outlet wherein a conventional convenience outlet is mounted in the box.

Briefly stated, in accordance with one of its aspects, this invention is directed to a floor outlet box comprising an oblong rectangular base member having a mounting aperture therethrough, a lug centrally positioned on each of the short sides of the base member, a top member having two sides and a top of integral construction, the two sides being disposed to engage the short sides of the base member, the top member having open sides along the two long sides of the base member adapted to seat face plates, and a pair of spring catches mounted in the two sides of the top member disposed to engage the lugs on the base member to retain the top member in engagement with the base member.

Referring particularly to FIG. 1, a die cast base member 10 having an oblong rectangular shape has a lug 11 centrally positioned along each of the short sides and dowels or guide posts 12 at each of the four corners. Mounting of the base member 10 upon an insert (not shown) of an underfloor duct (not shown) is by means of a flanged mounting screw 13 extending through an aperture 14 in the base member 10 and tightened into a threaded adapter 15 which is mounted in an insert. Use of the threaded adapter 15 is occasioned by the fact that the diameter of the insert is made quite large in order to simplify the threading of wiring therethrough. Thus, the adapter 15 is screwed into the insert and the base member 10 is thereafter mounted on the insert as previously described. The base 10 has a pair of threaded apertures 16 on which may be mounted a pair of mounting posts 17 for mounting three terminal blocks 18.

A top member indicated generally at 20 is a die casting consisting of two sides 21 and a top 22. The two open sides of the top member 20 are equipped with threaded apertures 23 and are disposed to seat face plates, such as 24, by means of screws 25 and apertures 26, the screws 25 being positioned in the threaded apertures 23. Mounted upon the interior of the top member 20 is a pair of spring catches 27 which are adapted to engage the lugs 11. It will be noted that the lugs 11 are equipped with a beveled surface over which the spring catches 27 ride as the top member 20 is brought into engagement with the base 10. The underside of the lugs 11 may be tapered slightly so that as the spring catches 27 move into lock position, any variation in dimensions is taken up by the lug taper. The locking position of spring catches 27 is best illustrated in FIG. 4.

During installation, the base 10 is first positioned on the insert of the underfloor duct by means of the adapter ring 15 and mounting collar 13. If it is desired to mount the telephone terminal block illustrated in FIG. 1, the telephone wiring is first brought up through the mounting collar 13 and the mounting posts 17 are then screw fastened to the base 10. The terminal blocks 18 are then positioned on the mounting posts 17 and the various electrical connections made to these terminal blocks. The back face plate is then mounted upon the top member 20 and the exterior cord from the terminal blocks 18 is then run through a grommet 28 positioned in the front face plate 24 which is then mounted upon the top member 20. The top member 20 is equipped at its corners with guide apertures which mate with the guide posts 12 and these are now brought into alignment and the top member 20 pressed firmly against the base member 20. The spring catches 27 lock the top member 20 into its closed position and the external telephone connections can then be made. It will be noted that all internal connections could be made under conditions of complete accessibility.

In order to remove the top member 20, it is only necessary to remove one of the face plates 24 and release the spring catches 27 by a screw driver or similar tool.

FIG. 5 illustrates a distribution outlet in accordance with this invention wherein a conventional convenience outlet 30 is substituted for the terminal blocks 18 of the other figures. In this case, the convenience outlet 30 is mounted by means of mounting screws 25 which pass through the conventional apertures of the mounting strap of the convenience outlet into the threaded apertures 23 of the top member 20. Thereafter, a face plate 31 is positioned over the outlet 30 by means of a mounting screw 32 threaded into the conventional aperture of the outlet.

While the invention has been described with reference to specific embodiments thereof, it is obvious that there may be variations which fall within the spirit of the invention. Therefore, the invention should be limited in scope only as may be necessitated by the scope of the appended claim.

What I claim as new and desire to secure by Letters Patent of the United States is:

An electrical terminal floor outlet box comprising an oblong rectangular base member having a mounting aperture therethrough, a lug centrally positioned at each short side of said base member, a top member having two sides and a top of integral construction, the two sides being disposed to engage the short sides of said base member, said top member having open sides along the two long sides of said base member adapted to seat face plates, spaced threaded apertures in said top member for fastening face plates to the open faces thereof, a perpendicular guide member at each corner of the base member and an aligned aperture in each corner of the two sides of the top member and a pair of spring catches mounted in the two sides of said top member disposed to engage the lugs on said base member to lock said top member in engagement with said base member, said spring catches being releasable only from the interior of said box.

References Cited in the file of this patent
UNITED STATES PATENTS

| | | |
|---|---|---|
| 2,368,619 | Soderberg | Feb. 6, 1945 |
| 2,510,745 | Kilgore | June 6, 1950 |
| 2,932,683 | Flachbarth | Apr. 12, 1960 |